United States Patent [19]

Mork

[11] Patent Number: 5,213,164
[45] Date of Patent: * May 25, 1993

[54] SOIL LEVELING APPARATUS WITH IMPROVED FRAME AND HITCH

[76] Inventor: Orlan H. Mork, 6029 225th St., W., Farmington, Minn. 55024

[*] Notice: The portion of the term of this patent subsequent to Apr. 29, 2003 has been disclaimed.

[21] Appl. No.: 714,563

[22] Filed: Jun. 13, 1991

Related U.S. Application Data

[63] Continuation of Ser. No. 372,027, Jun. 27, 1989, Pat. No. 5,024,280, which is a continuation of Ser. No. 163,178, Feb. 26, 1988, abandoned, which is a continuation of Ser. No. 856,818, Apr. 28, 1986, abandoned, which is a continuation-in-part of Ser. No. 570,347, Jan. 13, 1984, Pat. No. 4,585,075, which is a continuation-in-part of Ser. No. 224,458, Jan. 12, 1981, Pat. No. 4,448,258.

[51] Int. Cl.⁵ .................................. A01B 59/043
[52] U.S. Cl. ............................ 172/445.1; 172/501; 172/684.5; 172/777
[58] Field of Search .............. 172/445.1, 439, 449, 172/501, 684.5, 777, 444

[56] References Cited

U.S. PATENT DOCUMENTS

| | | |
|---|---|---|
| 2,346,757 | 4/1944 | Horner . |
| 2,405,980 | 8/1946 | Sands et al. . |
| 2,712,278 | 7/1955 | Wilson ............................ 172/449 X |
| 3,122,209 | 2/1964 | Crites ................................ 172/188 |
| 3,193,306 | 7/1965 | Pettit . |
| 3,213,554 | 10/1965 | Dalton ................................. 37/145 |
| 3,319,367 | 5/1967 | Lewis . |
| 3,556,228 | 1/1971 | Mork ................................. 172/199 |
| 3,583,133 | 6/1971 | Kasberger . |
| 3,834,465 | 9/1974 | Collins .............................. 172/197 |
| 3,905,425 | 9/1975 | Jackson . |
| 4,232,878 | 11/1980 | Moore, Jr. .......................... 172/449 |
| 4,299,290 | 11/1981 | Nunes, Jr. ....................... 172/449 X |
| 4,386,662 | 6/1983 | Kalif ................................ 172/445.1 |
| 4,436,040 | 3/1984 | Chumley ........................... 172/197 |
| 4,655,297 | 4/1987 | Bourgeois, Jr. .................. 172/445.1 |

FOREIGN PATENT DOCUMENTS

| | | |
|---|---|---|
| 117395 | 7/1965 | Norway . |
| 849677 | 9/1960 | United Kingdom ............. 172/445.1 |

OTHER PUBLICATIONS

Brochure entitled Dakon Yard Leveler.
Three Tractor Hitch Photographs.
John Deere Catalog Page Illustrating Rotary Cutters.

*Primary Examiner*—Randolph A. Reese
*Assistant Examiner*—Spencer Warnick
*Attorney, Agent, or Firm*—James W. Miller

[57] ABSTRACT

An improved soil leveling apparatus (10) includes a frame (12), connecting hitch means (14), and adjustable lost motion linkage (48) secured to the top connection point (52) of the hitch, and an optional scarifier assembly (16) which is supported on a connector (66) pivoted between the legs (36,40) of the hitch. The scraper member (18) of the frame (12) is of generally inverted J-shaped cross section, and tine subassemblies (90) can be substituted for the teeth (78) on the scarifier assembly (12).

58 Claims, 10 Drawing Sheets

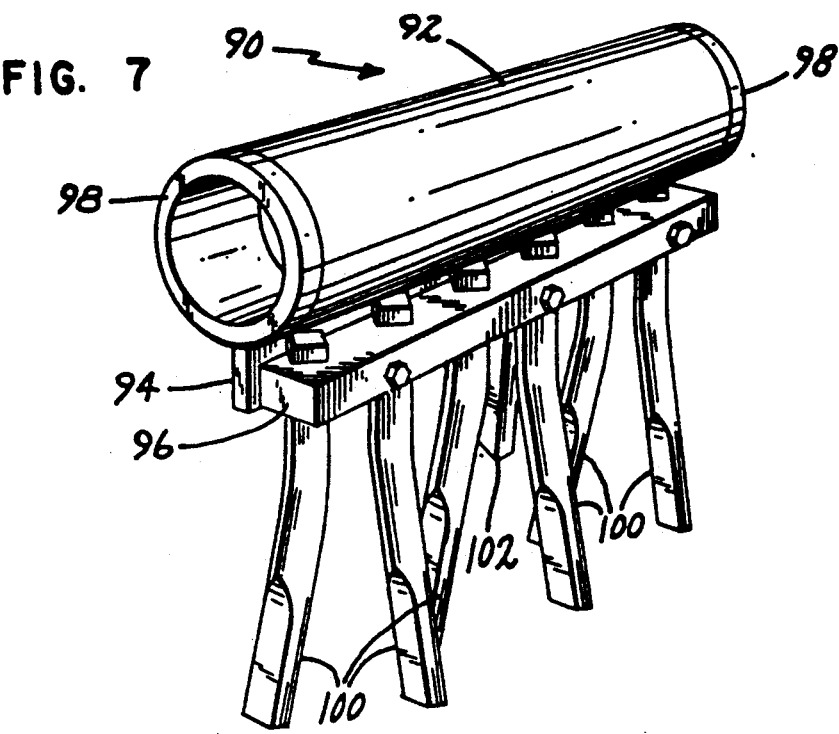
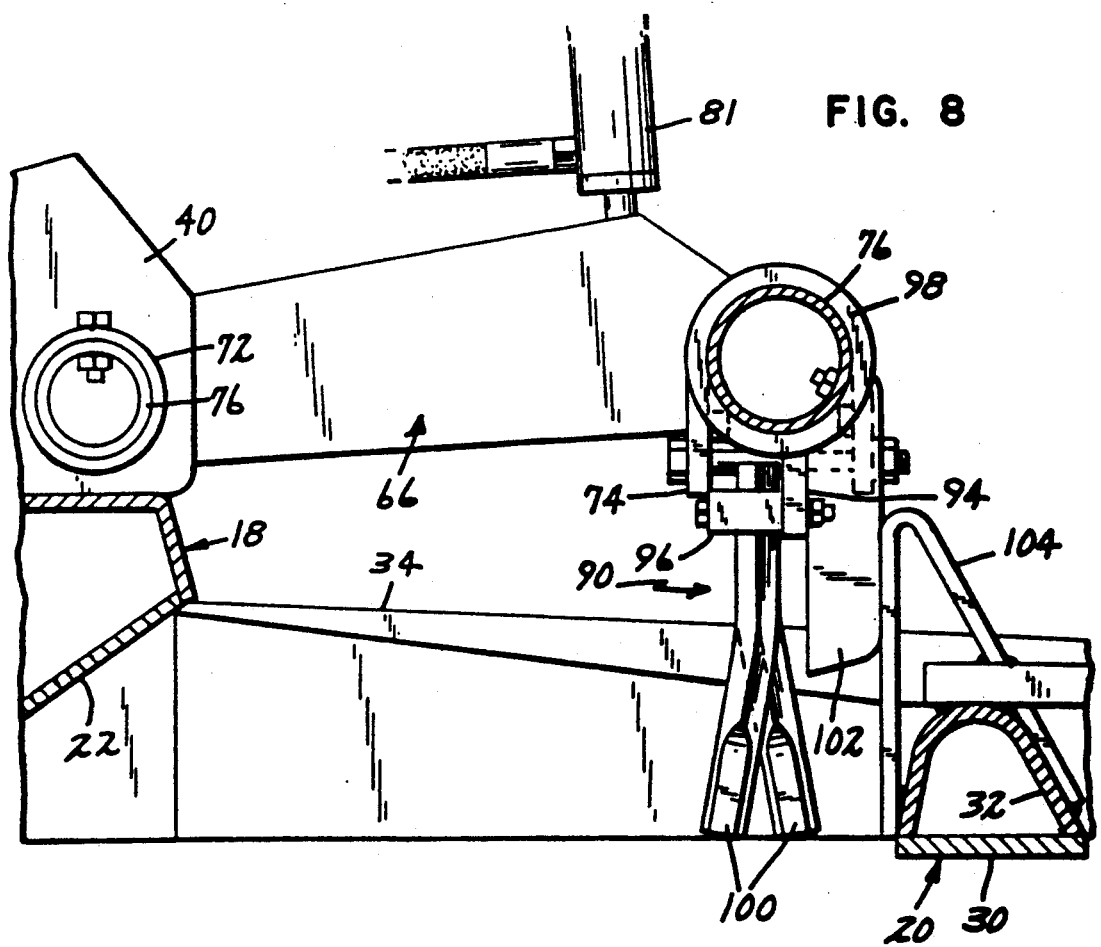

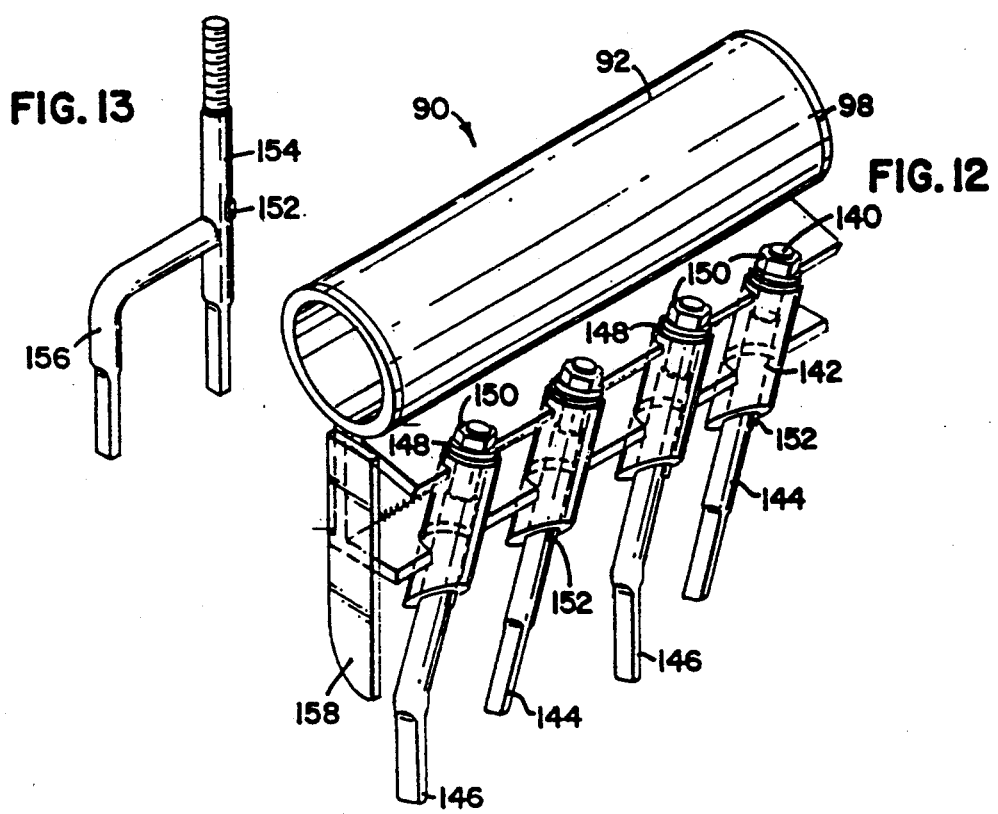
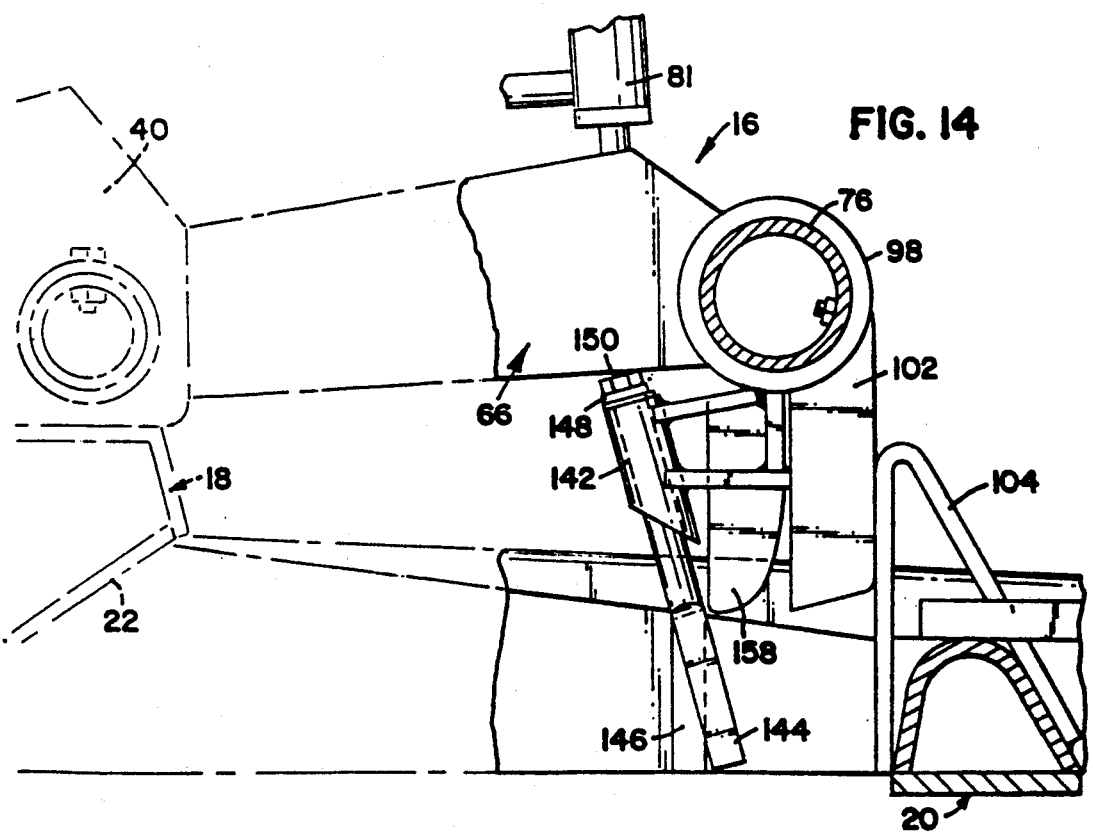

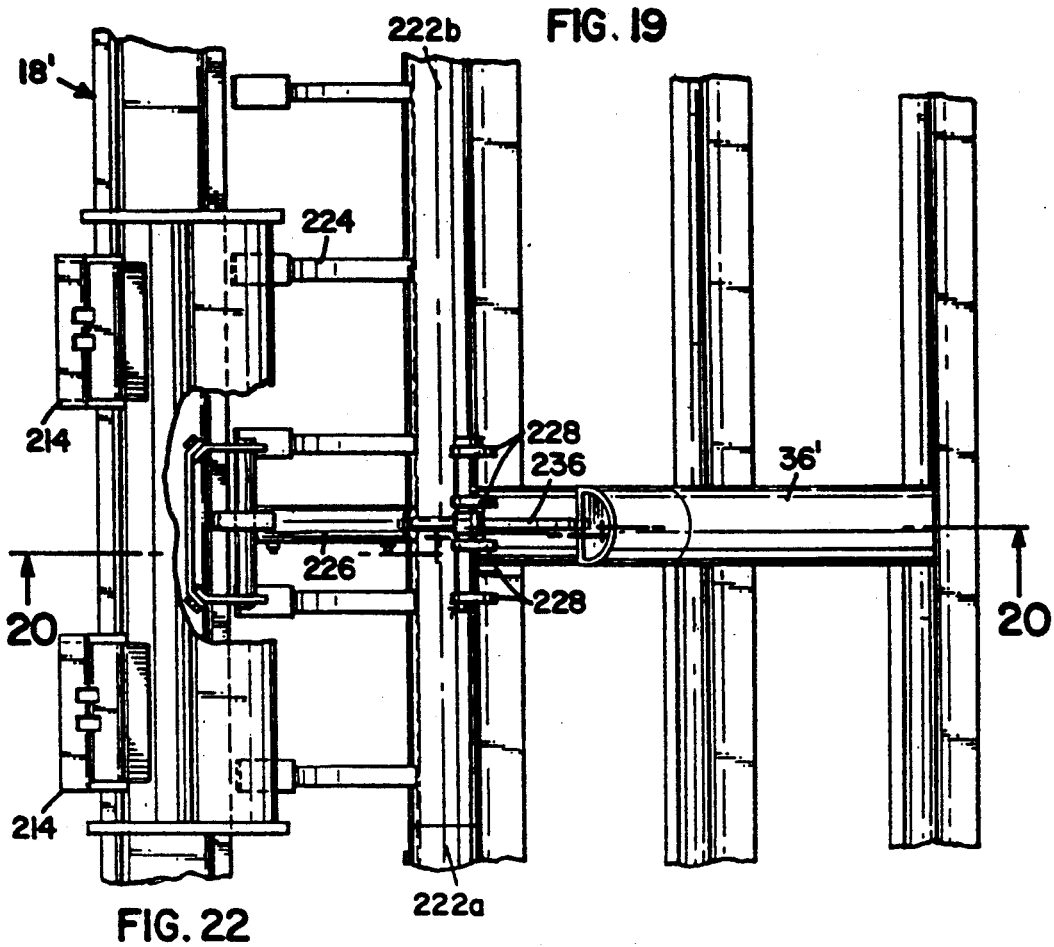
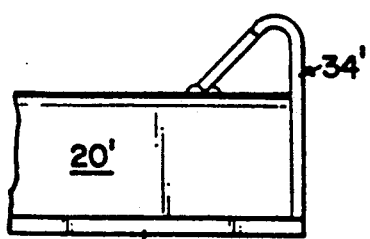
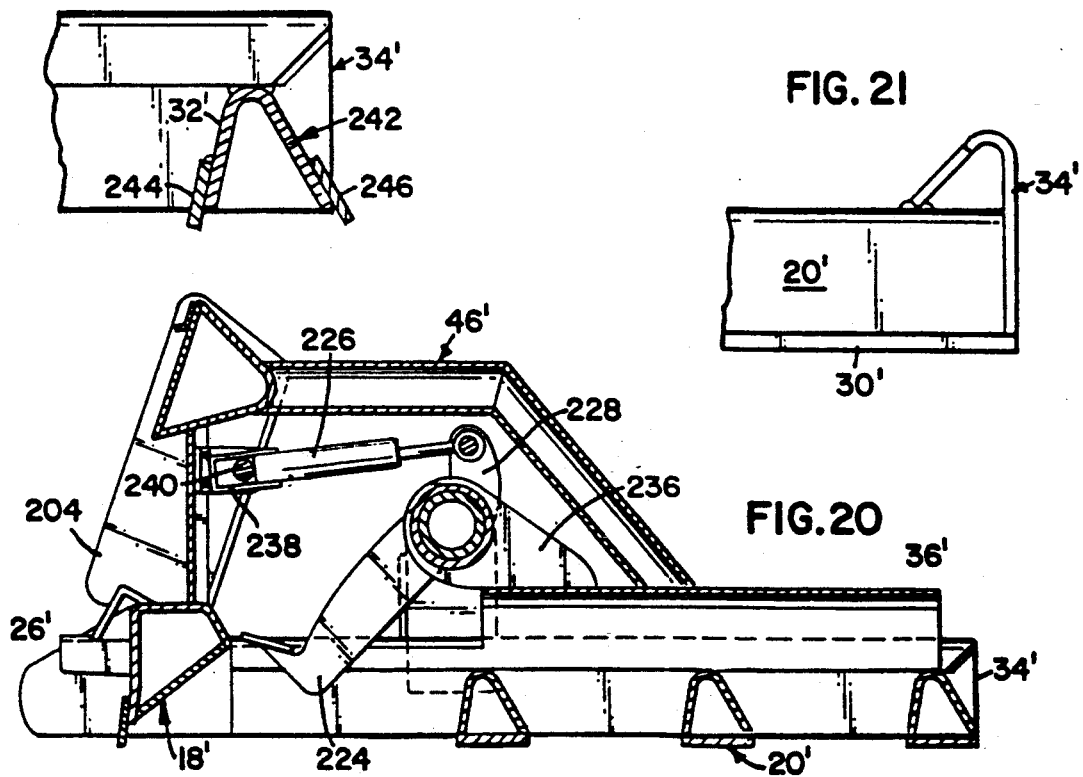

SOIL LEVELING APPARATUS WITH IMPROVED FRAME AND HITCH

CROSS REFERENCE TO RELATED APPLICATIONS

This application is a continuation of my co-pending application Ser. No. 07/372,027, now U.S. Pat. No. 5,024,280, filed Jun 27, 1989 which is a continuation of application Ser. No. 07/163,178, filed Feb. 26, 1988, abandoned, which is a continuation of application Ser. No. 06/856,818, filed Apr. 28, 1989, abandoned, which is a continuation-in-part of application Ser. No. 06/570,347, filed Jan. 13, 1984, now U.S. Pat. No. 4,585,075, which is a continuation-in-part of application Ser. No. 06/224,458, filed Jan. 12, 1981, now U.S. Pat. No. 4,448,258.

TECHNICAL FIELD

The present invention relates generally to a device for attachment to a vehicle for cutting, leveling and otherwise grading the soil or the like. More particularly, this invention concerns a soil leveling apparatus incorporating an improved frame, an improved hitch, and improved scarifier assembly, an optional pulverized attachment, and other features which provide more versatility and controlability to achieve better performance.

BACKGROUND ART

Proper site preparation requires that the ground be graded as necessary for compatibility with planting, sodding, paving or whatever the next and usually final construction of maintenance step may be. Such site preparation typically involves first breaking up and loosening the soil as necessary followed by leveling the soil to the desired grade. This may entail the use of different tools, depending upon the soil conditions, and multiple passes over the site which is both time consuming and expensive.

In the past weighted boards and the like were dragged behind tractors to smooth and level the surface of the soil. This technique was relatively crude and unsatisfactory because it did not allow for controlling the angle or grade of the soil surface, and loose dirt tended to collect in front of the board which would escape around the outer edges leaving ridges which then had to be smoothed manually with rakes or the like.

My prior U.S. Pat. No. 3,556,228 shows an apparatus for leveling soil and the like which was adapted to overcome the difficulties associated with the prior art at that time. This device generally consisted of a frame adapted for connection to a three-point hitch on a draft vehicle such as a tractor. The frame consisted of a number of transverse ground engaging members arranged in longitudinally spaced apart relationship. The leading member therein was a member of generally inverted U-shaped cross section to effect cutting, while the other trailing members were of closed, generally rectangular cross section for leveling purposes. The transverse ground engaging members were interconnected by longitudinal braces in a ladder-like fashion to form a rigid frame. Individual retaining shoes or plates were provided on opposite ends of each ground engaging member to retain loose soil to avoid formation of soil ridges.

This device operated well and was a significant improvement over the prior art at that time, although experience later showed that improvements could be made. The parent hereof, referenced above, discloses such an improved soil leveling apparatus. It has been found, however, that even this device can be improved upon. For example, under some soil conditions it has been found that the effectiveness of a leading ground engaging member of generally inverted U-shaped cross section can be severely restricted if it should become plugged with soil. In addition, three-point hitches of various types and ages exhibit various degrees of looseness which may not be compatible with different soil conditions. Some degree of play or looseness at the top link of the three-point hitch is generally desirable because it enables the apparatus to float somewhat on the soil surface without undue gouging, however, too much looseness is undesirable.

Further, some conditions may call for soil working relatively less aggressive, but which is desired as a substitute for or in addition to, that type of soil working provided by the scarifier assembly.

There is, thus, a need for an improved soil leveling apparatus of even greater versatility.

SUMMARY OF THE INVENTION

The present invention comprises an improved soil leveling apparatus which overcomes the foregoing and other difficulties associated with the prior art. In accordance with the invention, there is provided a soil leveling apparatus having an improved frame, connection means for the hitch, and other features, and options which enhance its capability and versatility.

The frame comprises a plurality of transverse ground engaging members, the leading member being a scraper member of generally inverted J-shaped cross section in order to avoid soil plugging. The frame includes a pair of laterally spaced apart side frame members which are of uneven channel-like configuration secured to opposite ends of the trailing ground engaging member so as to reduce construction costs while providing the necessary structural rigidity.

The trailing ground engaging members are of generally inverted rounded V-shaped cross section in order to provide a substantially upright surface for pushing the soil in a forward direction, with an inclined surface for lifting the soil in a rearward direction.

The connection means on the frame for securing the apparatus to a three-point hitch is of generally A-shaped configurations, which is also adapted to serve as the support for the adjustable scarifier assembly. This also simplifies construction of the soil leveling apparatus and enhances the structural integrity thereof. An adjustable lost motion linkage is preferably provided at the top end of the connection means for receiving the top link of a three-point hitch in order to provide the degree of play desirable under the particular conditions.

BRIEF DESCRIPTION OF THE DRAWINGS

A better understanding of the invention can be had by reference to the following Detailed Description in conjunction with the accompanying Drawings, wherein:

FIG. 6 is a vertical sectional view taken along lines 6—6 of FIG. 5 in the direction of the arrows;

FIG. 7 is an enlarged perspective detailed view showing a tine assembly which can be substituted for the teeth of the scarifier assembly in order to provide relatively less aggressive soil working action;

FIG. 8 is a sectional detailed view showing the tine assembly of FIG. 7 mounted on the cross-shaft of the scarifier assembly;

FIG. 12 is an enlarged perspective detailed view of a modified tine assembly;

FIG. 13 is an enlarged perspective view of an offset time can be used in the tine assembly of FIG. 12;

FIG. 14 is a sectional detailed view showing the tine assembly of FIG. 12 mounted on the cross shaft of the scarifier assembly of the first embodiment;

FIG. 19 is a partial top view of a modified scarifier assembly;

FIG. 20 is a vertical cross sectional view taken along lines 20—20 of FIG. 19 in the direction of the arrows;

FIG. 21 is a partial end view of the soil leveling apparatus showing the configuration of the side members; and FIG. 22 is a diagram showing an alternate construction of the trailing ground engaging members.

DETAILED DESCRIPTION

The entire disclosure of U.S. Pat. No. 4,448,258 is incorporated herein by reference.

Figure 1:
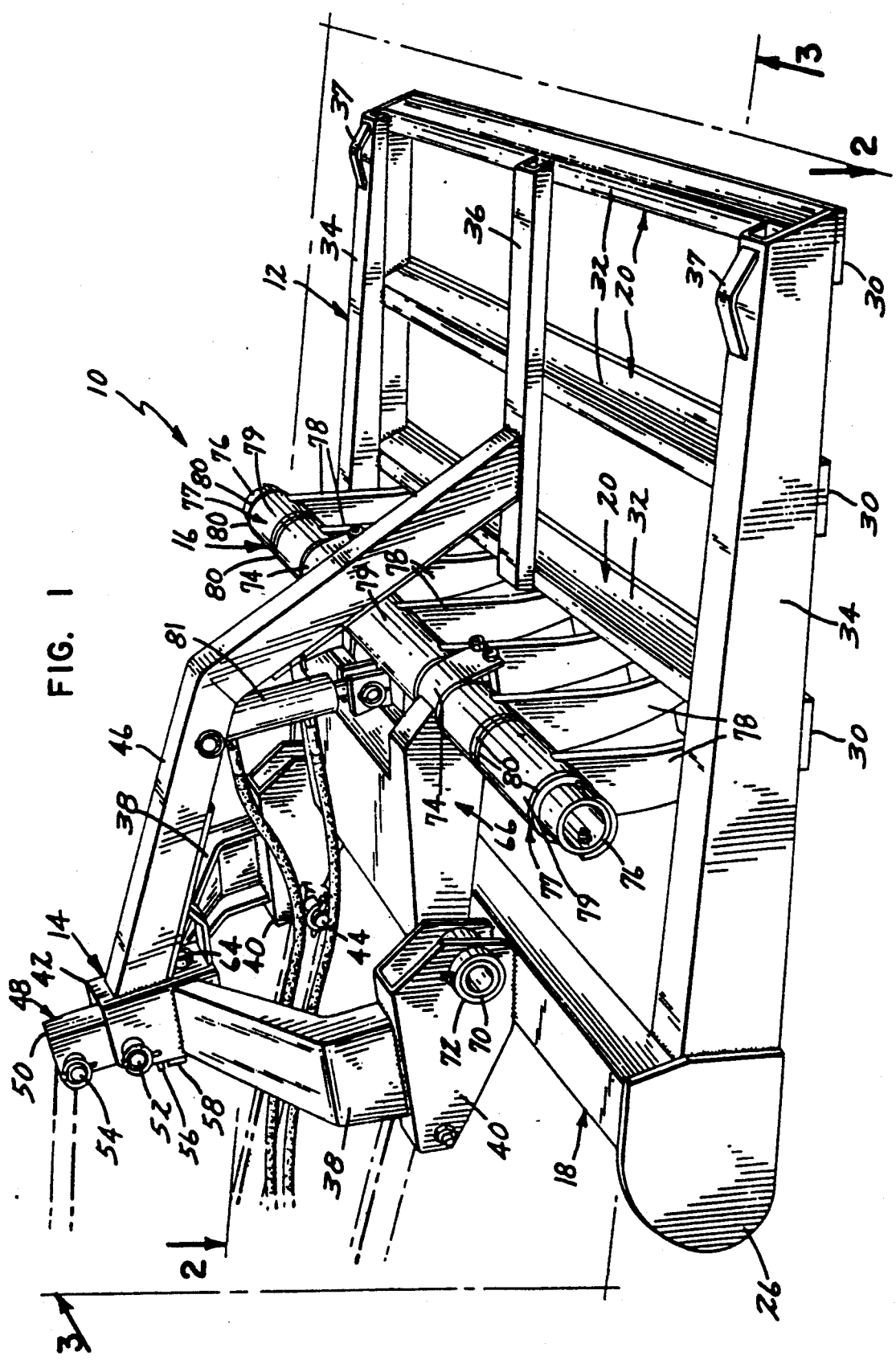
FIG. 1 is a perspective view of an improved soil leveling apparatus incorporating a first embodiment of the invention.

Referring now to the Drawings herein, in which like reference numeral designate like or corresponding elements throughout the views, and particularly referring to FIG. 1, there is shown a soil leveling apparatus 10 of the invention. The apparatus 10 comprises a frame 12, a hitch or connection means 14 mounted on the frame for attachment of the apparatus to a suitable draft means, and a scarifier assembly 16.

As illustrated, the connection means 14 is adapted for use with a three-point hitch, however, it will be appreciated that the frame 12 of the apparatus 10 can be provided with a connection means like that shown in the parent application for use with a skid-steer vehicle or any other suitable connecting hitch means depending upon the type of draft vehicle with which the apparatus is to be used.

Figure 2:
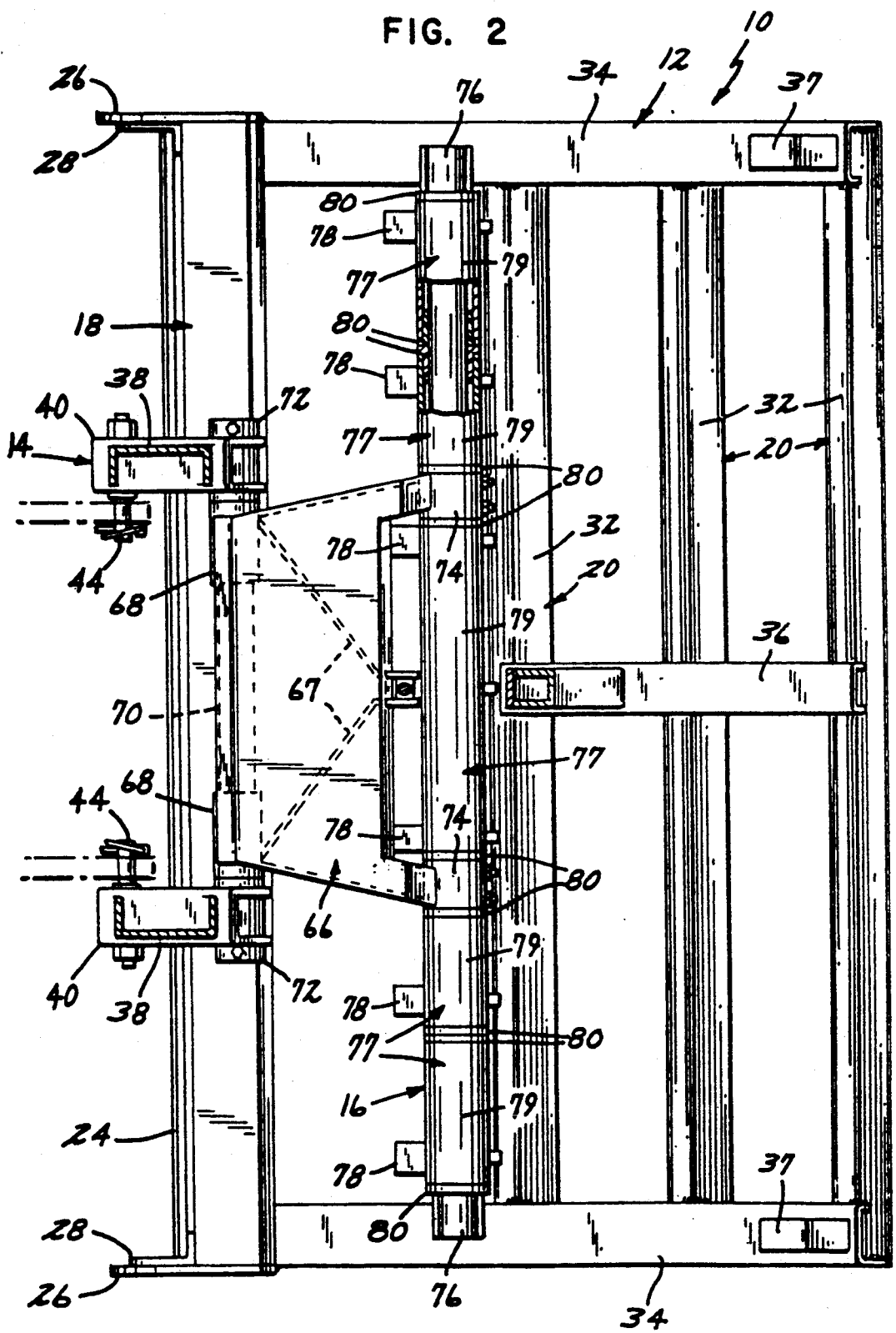
FIG. 2 is a horizontal sectional view taken along lines 2—2 of FIG. 1 in the direction of the arrow.
Figure 3:
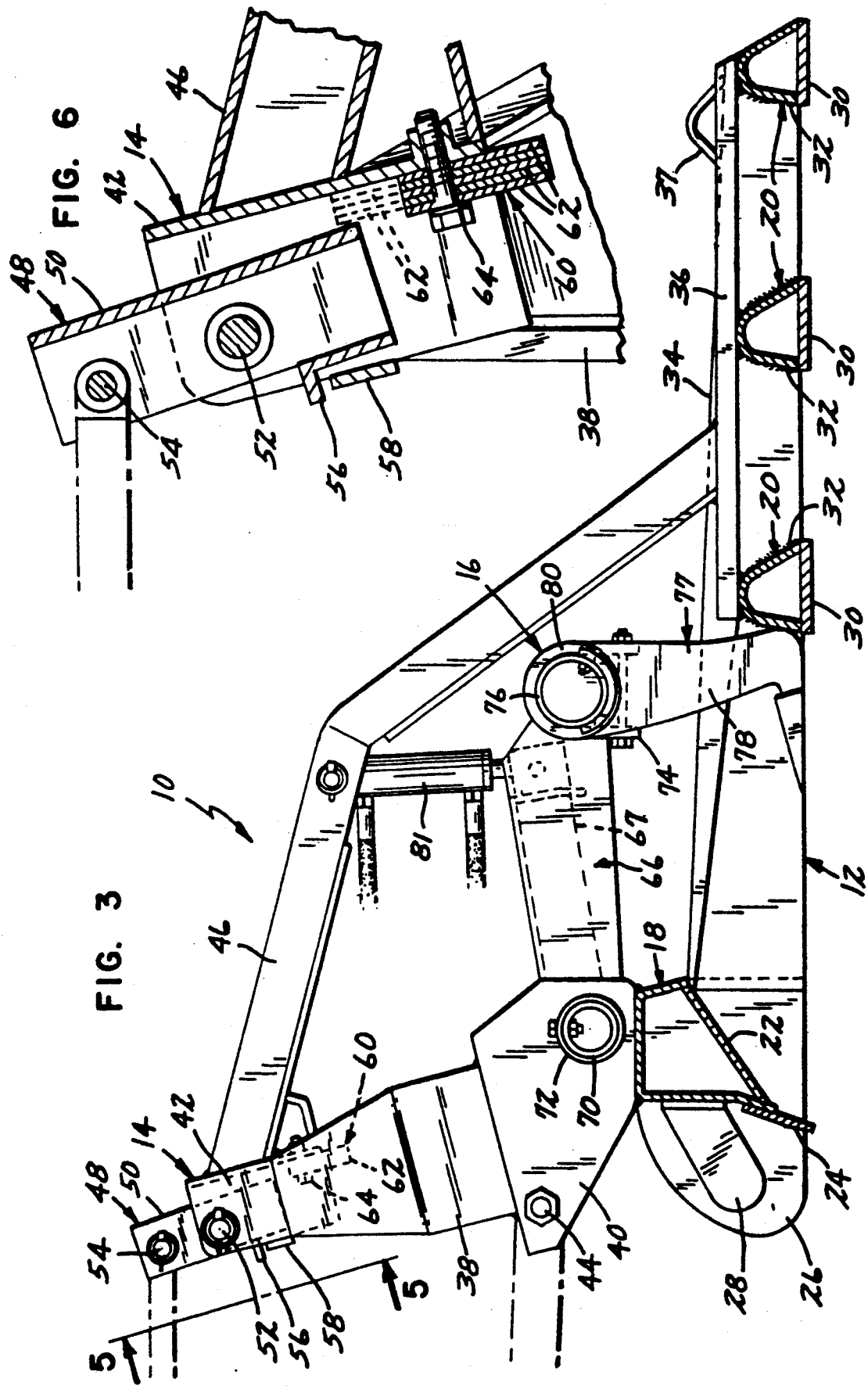
FIG. 3 is a vertical sectional view taken along lines 3—3 of FIG. 1 in the direction of the arrows.

Referring now to FIG. 1 in conjunction with FIGS. 2 and 3, the frame 12 of the soil leveling apparatus 10 comprises a leading ground engaging member 18 and a plurality of trailing ground engaging members 20. All of the ground engaging members 18 and 20 are oriented transverse to the direction of travel of the apparatus 10. The forward ground engaging member 18, as is best seen in FIG. 3, is of generally inverted J-shaped cross section and includes braces 22 secured between the divergent front and back walls of the ground engaging member. A blade 24 is secured to the front, relatively longer wall of the ground engaging member 18 for better cutting action and wear resistance. The blade 24 can be welded, bolted or otherwise suitably secured to the forward ground engaging member 18. It will thus be apparent that the rear wall of the forward ground engaging member 18 is relatively shorter than the front wall. This is advantageous because it provides rigidity without allowing soil to plug the interior of the member, which can occur under certain conditions when an inverted channel section is utilized for the forward ground engaging member. The forward ground engaging member 18 thus functions as a scraper member.

The forward ground engaging member 18 is secured between a pair of side plates 26 which serve as soil retainers to prevent the soil from flowing outwardly around the apparatus and thus forming ridges. If desired, braces 28 can be secured between the soil retaining plates 28 and the forward ground engaging member 18 for reinforcement.

A plurality of trailing ground engaging members 20 are located behind the forward ground engaging member 18 for purposes of leveling the soil. Three trailing ground engaging members 20 are shown, however, any suitable number can be utilized. Each trailing ground engaging member 20 includes a wear plate 30 secured to and enclosing the open end of a hollow member 32. The hollow member 32 is preferably of generally inverted rounded V-shaped cross section with the forward wall thereof being substantially upright in order to push the soil in a forward direction, and the rear wall being inclined to allow the soil to pass over the ground engaging member in the reverse direction.

The trailing ground engaging members 20 are secured between a pair of longitudinal side members 34. Each side member 34 is of general channel-shaped cross section along the portion thereof extending between the trailing ground engaging members 20 with the upper surfaces of the side members sloping downwardly away from the forward ground engaging members 18. The ends of the trailing ground engaging members 20 are thus butted against the outer legs of the side members 34 and are welded at their ends both to the outer leg and to the lower edge of the inner legs of the side members. A longitudinal member 36 is preferably secured across the tops of the trailing ground engaging members 20 for additional rigidity. If desired, lugs 37 can be attached to the side members 34 for connection of a drag or the like to the apparatus 10.

The connection means 14 is of generally A-shaped configuration including a pair of legs 38 which are secured at their lower ends to a pair of laterally spaced apart feet or supports 40 secured to the forward ground engaging member 18. The legs 38, which are inclined forwardly as shown, extend upwardly to a member 42. The connection means 14, as illustrated, is adapted for use with a three-point hitch, the top and bottom links of which are indicated by phantom lines. The base supports 40 include pivotal connection points 44 for attachment to the bottom links of a three-point hitch, while the top member 42 is adapted for attachment to the top link of the three-point hitch. A longitudinal brace 46 is preferably connected between the top member 42 of the connection means 14 and the longitudinal member 46 of the frame 12.

Figure 5:
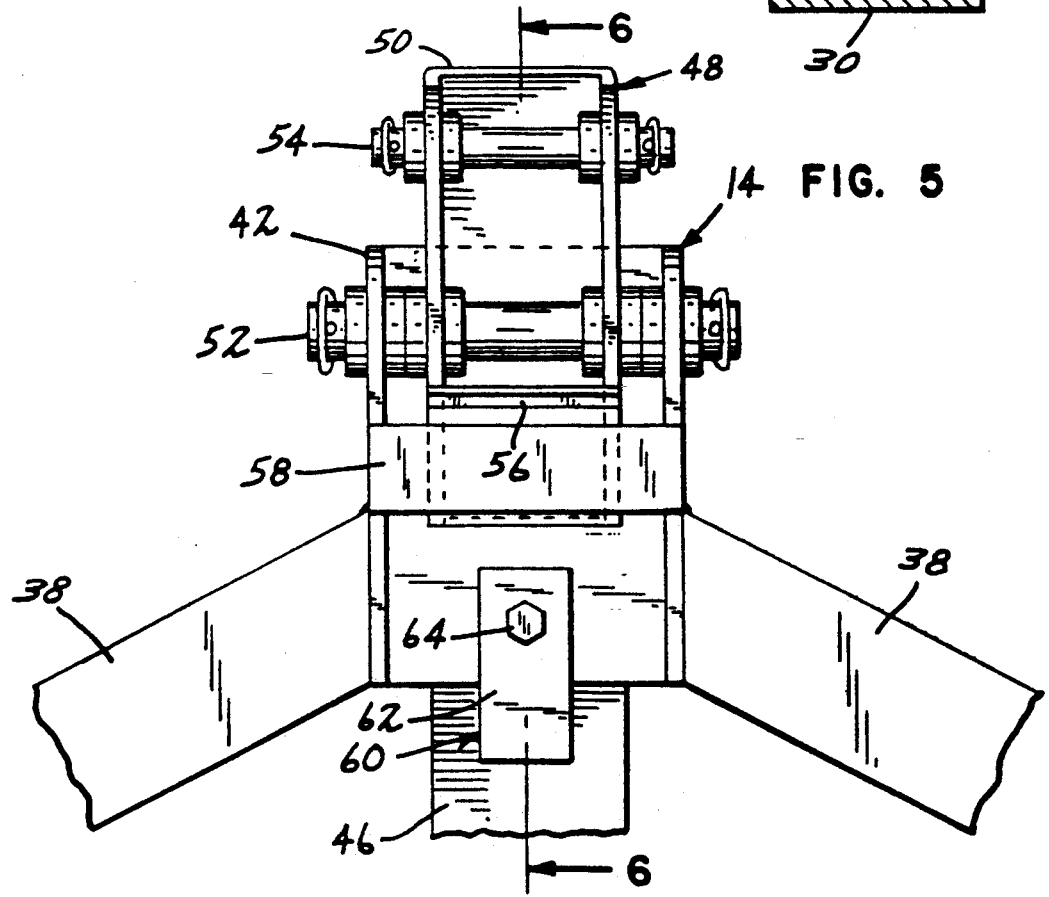
FIG. 5 is a view taken along lines 5—5 of FIG. 3 showing the front side of the adjustable lost motion linkage mounted at the top end of the connection means.

Referring to FIG. 3 in conjunction with FIGS. 5 and 6, the soil leveling apparatus 10 preferably includes a lost motion linkage 48 in the top member 42 of the connecting means 14. The purpose of the lost motion linkage 48 is to provide an adjustable amount of controlled play between the top link of the three-point hitch on the draft vehicle (not shown) and the connection means 14 so that some pivotal floating action of the soil leveling apparatus can occur. The lost motion linkage 14 includes a plate 50, which is illustrated as being a section of channel stock, supported for pivotal movement on a pin 52 extending across the top member 42. Another pivotal connection 54 is provided at the upper end of the plate 50 for attachment to the top link of the three-point hitch on the draft vehicle. A first stop 56 is secured to the lower end of the plate 50 for cooperation with a cross piece 58 extending across the lower end of the top member 42. The lost motion linkage 48 thus includes a fixed stop which limits rearward pivotal motion of the plate 50. An adjustable stop 60 is also provided for limiting forward pivoting of the plate 50. As illustrated, the adjustable stop 60 comprises a number of shims 62 with offset holes therein through which a bolt 64 extends to secure the shims to the inside of the top member 42. It will thus be appreciated that the amount of pivotal motion of the plate 50 can be controlled by loosening the bolt 64 and turning a suitable number of shims upwardly between the lower end of the plate 50 and the back of the top member 42, as shown in FIG. 1, the then tightening the shims in place with the bolt 64 so as to limit the range of fore/aft pivotal movement of the linkage 48. This comprises a significant feature of the present invention. By means of the adjustable lost motion linkage 48, suitable play can be provided between the top link of a three-point hitch and the connection means 14 of the soil leveling apparatus 10.

Referring again to FIGS. 1 through 3, the soil leveling apparatus 10 preferably includes a scarifier assembly 16 which is mounted for adjustable, vertical positioning relative to the frame 12. The scarifier assembly 16 includes a single connector 66 having a pair of sleeves 68 secured at the forward end for receiving a cross shaft 70 extending between the base members 40 of the connection means 14. The cross shaft 70 extends through the sleeves 68 of the connectors 66 and through bused holes in the base members 40, and is retained in place by means of collars 72.

The connector 66, which is preferably formed from a piece of plate bent as shown for rigidity, also includes a pair of clamps 74 at the side opposite that of the sleeves 68. Clamps 74 function to secure the pivotal connector 66 to a second, relatively longer cross shaft 76 on which the teeth subassemblies 77 are suspended in side-by-side relationship between end caps 75. Each subassembly 77 includes a depending tooth 78 secured at its upper end to a sleeve 79 pivotally supported on the second cross shaft 76. The scarifier teeth 78 can be individually pivoted to the cross shaft 76, or pivotally supported in groups. Bushings 80 are provided in the ends of each sleeve 79. A double acting cylinder 81 is connected between the top brace 46 and a pair of lugs on the connector 66 for controlling the position of the scarifier assembly 16 and thus the extend of penetration into the soil by the teeth 78.

If desired, a pair of diagonal braces 67, as is best seen in FIG. 2, can be provided on the underside of the connector 66 for reinforcement.

Figure 4:
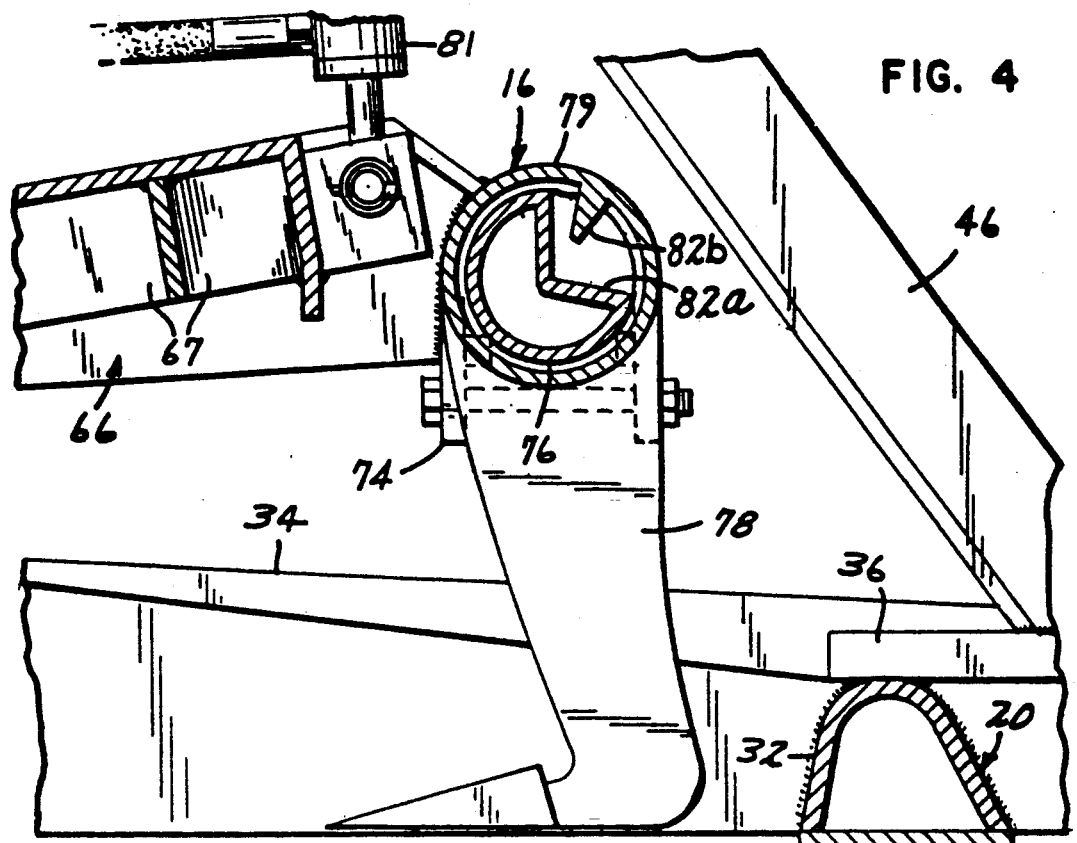
FIG. 4 is an enlarged detailed view of a modification of the scarifier stop assembly.

Referring momentarily to FIG. 4, there is shown a modification of the scarifier assembly 16. The scarifier assembly 16 as shown in FIG. 1 through 3 includes a number of pivotal scarifier teeth 78 whose rearward pivotal motion is limited by the adjacent trailing ground engaging member 20. The longitudinal spacing between the forward ground engaging member 18 and the next adjacent ground engaging member 20 is preferably sufficient to allow the scarifier teeth 78 to pivot forwardly out of ground engagement when the apparatus 10 is reversed. In some situations, however, it may be desirable to limit pivotal movement of the scarifier teeth 78 by means other than the next adjacent trailing ground engaging member 20. For example, the second cross shaft 76 can be notched as shown in FIG. 4 for cooperation with an inwardly projecting stop 82 provided on the sleeve supporting the tooth. The particular orientation of the notch in the cross shaft 76 and the stop 82 is not critical to the invention, however, in some situations it may be desirable to rotate their position about 150 degrees clockwise from that shown for better load distribution. Those skilled in the art will appreciate that the disclosed stop arrangement can be reversed so that a stop member is provided on the cross shaft 76 for cooperation with a notch in the sleeve supporting the scarifier teeth 78. This is considered fully equivalent.

FIGS. 7 and 8 illustrate another modification of the scarifier assembly 16. Some conditions call for working the soil less aggressively than the scarifier teeth 78 would provided. In such situations, tine subassemblies 90 can be substituted for the scarifier subassemblies 77 on the cross shaft 76. Each tine subassembly 90 includes a sleeve 92 with a flange 94 and tool bar 96 secured thereto. Bushings 98 of plastic or other suitable construction are preferably provided in opposite ends of the sleeve 92. A plurality of depending tines 100 are secured to the tool bar 96. As illustrated, the lower ends of the tines 100 diverge outwardly, however, this is not critical to practice of the invention and either straight or curved tines can be utilized as desired. Each tine subassembly 90 further includes a stop 102 thereon for cooperation with another stop 104 mounted on the next adjacent trailing ground engaging member 20. Since the tines 100 are generally less rigid than the scarifier teeth 78, the use of such separate stop structure is preferable. If desired, of course, such separate stop structure could also be adapted for use with the scarifier subassemblies 77. Another cylinder 136 is coupled between the frame brace 46 and the forward cross member 122 of the attachment 110 for controlling its pivotal positioning.

Figure 9:
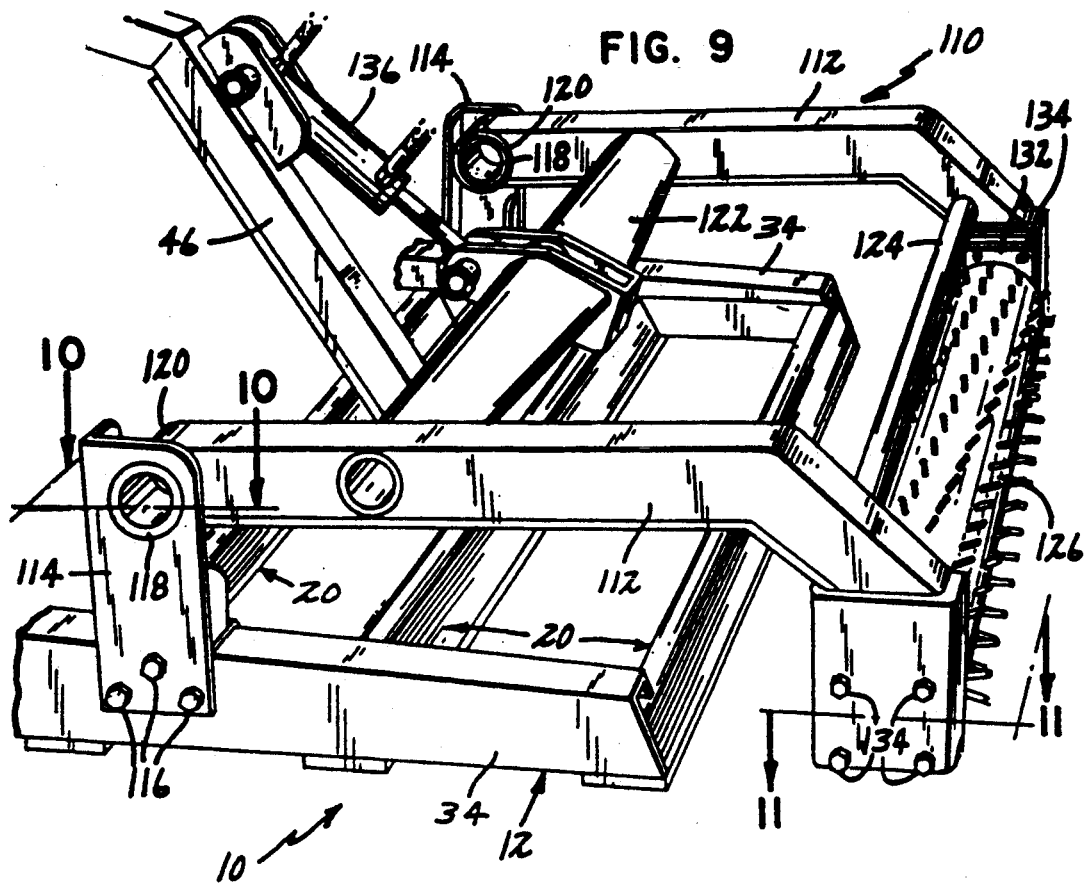
FIG. 9 is a partial perspective view showing the soil leveling apparatus herein with an optional pivotal pulverisor assembly mounted thereon.
Figure 10:
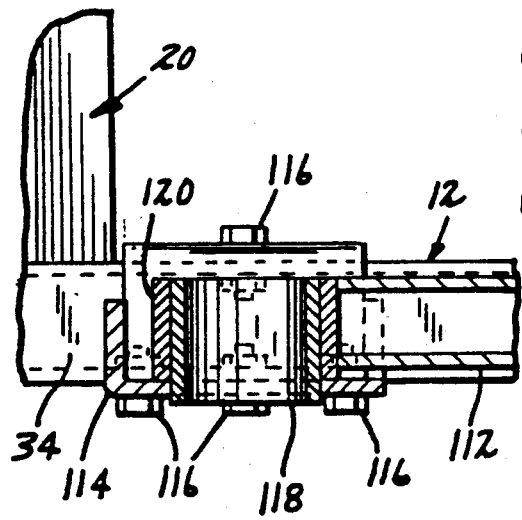
FIGS. 10 and 11 are sectional views taken along lines 10—10 and 11—11, respectively, of FIG. 9 in the direction of the arrows.
Figure 11:
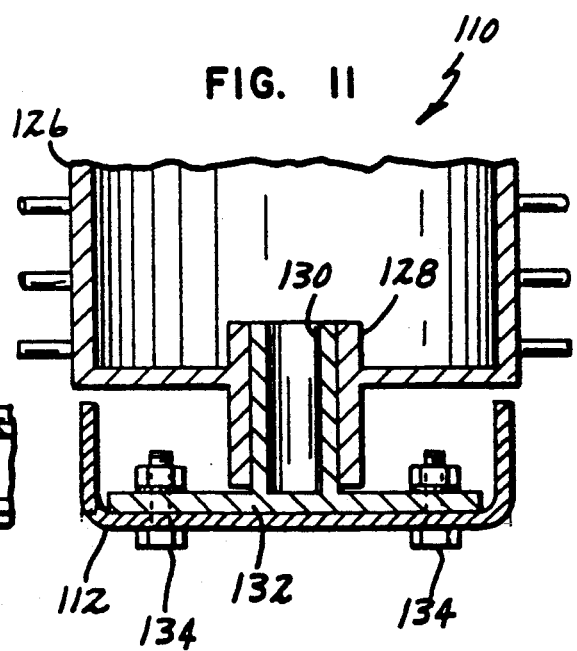
Figure 15:
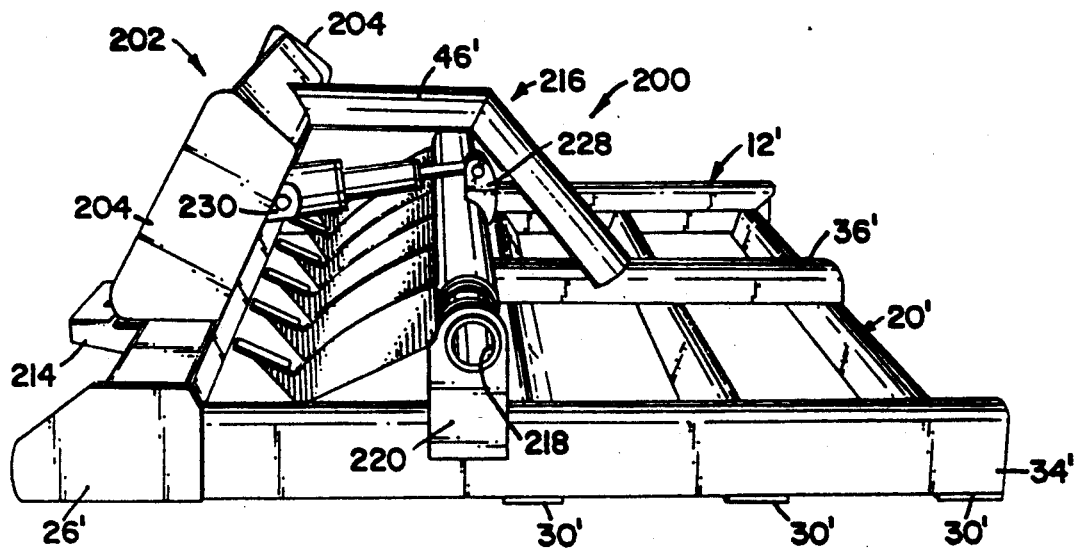
FIG. 15 is a perspective view of an improved soil leveling apparatus incorporating a second embodiment of the invention.
Figure 18:
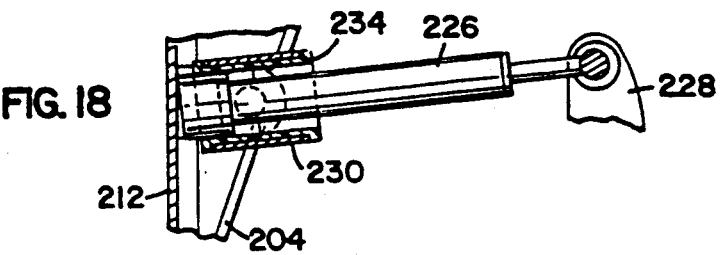
FIG. 18 is a partial cross sectional diagram showing the relationship between the cylinder and collar of the actuator used in the scarifier assembly.

Referring not to FIGS. 9, 10 and 11, there is shown an optional pulverizer attachment 110 which can be mounted on the soil leveling apparatus 10 to provide additional soil working. The attachment 110 includes a pair of arms 112 which are pivoted at their forward ends to brackets 114 secured by bolts 116 to the side members 34 of frame 12. Each bracket 114 includes an inner sleeve 118 on which an outer sleeve 120 of the associated arm is received to define a pivot. A pair of cross members 122, 124 are secured between the arms 112 for rigidity and bracing. A toothed roller 126 is mounted for rotation between the outer or trailing ends of the arms 112. As is best seen in FIG. 11, a bushing 129 is provided in each end of the roller 126 for rotation on an inwardly projecting trunion 130 on a plate 132 secured by bolts 134 to the associated arm 112. This type of mounting enables the roller 126 to span substantially the entire width of the apparatus 10 so that the apparatus can be operated closely adjacent to buildings, sidewalks, etc. Although the assembly 110 is illustrated with a toothed roller 126 for pulverizing small dirt clods and the like, it will be appreciated that other devices can be mounted on the attachment. For example, a row of spring fingers or flexible tines can easily be substituted for the toothed roller 126 and carried by the attachment 110.

FIGS. 12 and 14 illustrates a modification of the tine sub-assembly 90 shown in FIGS. 7 and 8. In the subassembly 90, the tines 100 are secured in fixed relationship to the tool bar 96. Although this construction is sufficiently rugged for most applications, the tines can become damaged and required replacement. Since the tine sub-assembly 90 is not particularly well suited to individual replacement of the tines, the tool bar 96 can be replaced with a channel-line member 140 having a plurality of individual tine carriers 142 secured in laterally spaced apart relationship thereto. Each carrier 142 is of generally cylindrical construction, with a flat upper end and a beveled lower end. Replaceable tines 144 and 146 are individually mounted in the carriers 142. The tines 144 are substantially straight, while the tines 146 are angled and positioned in alternate carriers 142. Each of the tines 144 and 146 includes a threaded upper end extending through the respective carrier 142 and being secured in place by means of a washer 148 and nut 150. In addition, each of tines 144 and 146 includes an upset portion or raised lug 152 thereon which engages the beveled lower ends of the carrier 142 so as the effect automatic centering when the nuts 150 are tightened. It will thus be apparent that the tine 144 and 146 can be readily replaced individually.

FIG. 13 shows another tine 154 having a straight portion and offset leg portion 156 that can be used in the position of the endmost tine in the sub-assembly 90 in order to span the gaps between adjacent tine sub-assemblies and thus effect scarifying over substantially the entire width of the scarifier assembly 16. The offset tine 154 also includes a raised lug 152 for centering purposes, and an auxiliary stop 158 is preferably secured to the respective end of the member 140 to reinforce the offset tine against bending and rotation.

Referring now to FIGS. 15–19, there is shown a soil leveling apparatus 200 incorporating a second embodiment of the invention. The soil leveling apparatus 200 of the second embodiment incorporates numerous component parts which are substantially similar to those employed in the apparatus 10 of the first embodiment herein. Such component parts have been identified with the same reference numerals utilized herein before, but have been differentiated therefrom by means of prime (') notations.

The primary difference between the soil leveling apparatus 200 of the second embodiment and the apparatus 10 of the first embodiment is centered in the areas of the hitch and the scarifier assembly. The apparatus 10 of the first embodiment incorporates a connection means 14 which is adapted for use with a three-point hitch, like that typically used on tractors. The soil leveling apparatus 200 of the second embodiment, however, preferably includes a hitch 202 which is particularly adapted to use with adapters of the type found on skid steer loaders, although either type of hitch can be used.

The hitch 202 comprises a pair of laterally spaced apart side plates 204 which are interconnected by cross plates 206 and 208 defining a converging recess for receiving the upper edge of the pivotal edge adapter plate on the loader. As shown, the cross plate 205 is reinforced by a channel section 210 and an upright post 212. A pair of laterally spaced apart lower mount plates 214 are secured to the front wall of the leading ground engaging member 18' for releasable connection with latches on the lower end of the adapter plate (not shown) on the loader. An adaptor plate of suitable construction is shown in U.S. Pat. No. 3,672,521, the entire disclosure of which is incorporated herein by reference.

As illustrated, the soil leveling apparatus 200 also includes an optional scarifier assembly 216. The apparatus 200 can be used either with or without the scarifier assembly 216. As shown the scarifier assembly 216 includes a fixed cross shaft 218 secured between a pair of brackets 220 fixed to the longitudinal side members 34', which are preferably of inverted generally J-shaped cross section as is best seen in FIG. 21, although side members of any suitable configuration can be used. A sleeve 222 is supported for rotation about the fixed shaft 218, and a plurality of depending scarifier teeth 224 are secured along the sleeve.

Figure 17:
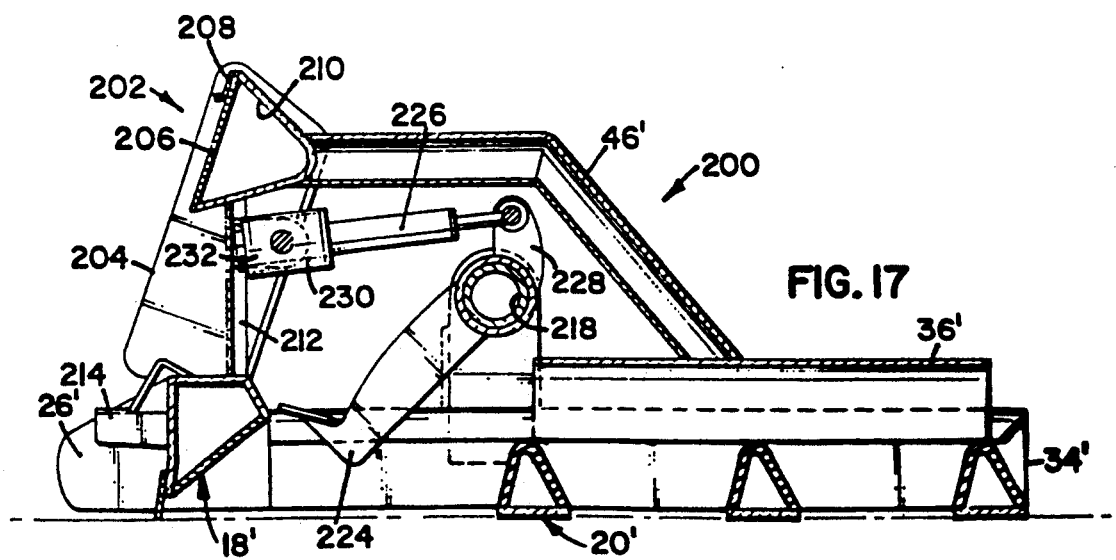
FIG. 17 is a vertical sectional view taken along lines 17—17 of FIG. 16 in the direction of the arrows.
Figure 16:
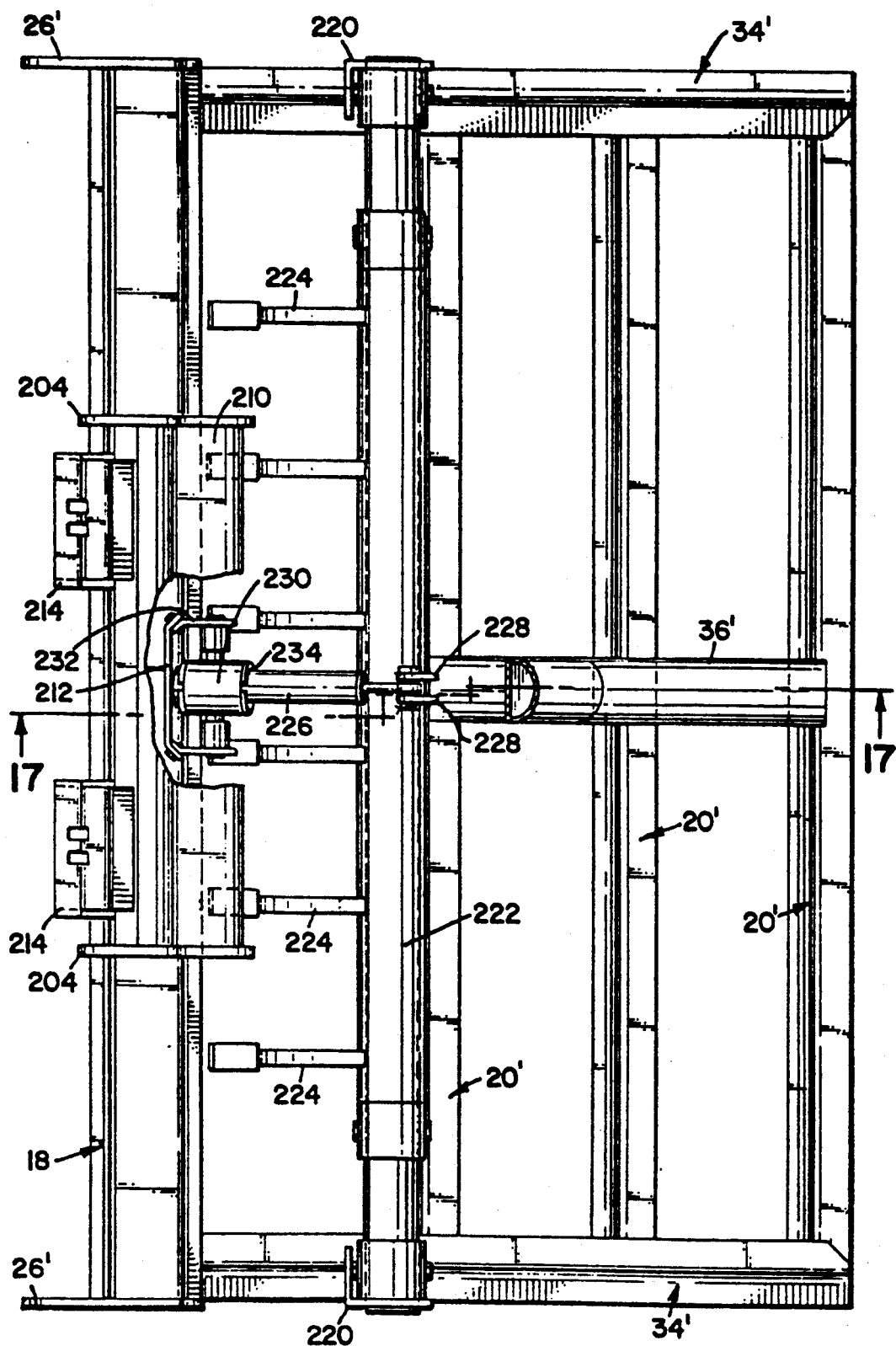
FIG. 16 is a top view of the soil leveling apparatus.

The scarifier assembly 216 is actuated by a cylinder 226 coupled between an offset lug 228 secured to the sleeve 222, and a collar 230 as is best seen in FIG. 17. The piston end of cylinder 226 is coupled to lug 228, while the cylinder end thereof is slideably received in the collar 230. The collar 230 is pivoted on a pair of trunions secured between a pair of lugs 232 on the post 212. In the preferred embodiment, a liner 234 of plastic or other suitable low friction material is provided within the collar 230 to facilitate slideably movement of the cylinder 226. This construction thus provides a lost motion connection which enables the operator to reverse direction with the scarifying teeth 224 pivoting upward and riding on the ground, but without actuating cylinder 226. When cylinder 226 is extended, the cylinder end thereof moves within collar 230 into stopped engagement with post brace 212 so that the scarifier teeth 224 are raised completely or partially out of engagement with the soil. When the cylinder 226 is retracted, the scarifier teeth 224 simply return to their lowered positions, undergravity, as the cylinder end slides away from post 212 in the collar 230, thus providing a lost motion connection which enables the teeth to ride up out of engagement with the soil when the unit is reversed without requiring actuation of the cylinder.

It will be noted that the soil leveling apparatus 200 also incorporates a longitudinal member 36' and a longitudinal brace 46' of generally channel-like construction, but more rounded in order to facilitate forming in a simpler, less expensive manner. In all other respects, the soil leveling apparatus 200 is functionally and structurally similar to the apparatus 10.

FIGS. 19 and 20 illustrate a modification involving usage of an intermediate bracket 236 supporting the cross shaft 218 and providing reinforcement against bending. Usage of an intermediate support bracket 236, however, requires splitting the sleeve 222 into sleeve sections 222-A and 222-B, each of which is provided with a pair of lugs 228-A as is best seen in FIG. 19. In addition, instead of a collar 230, the cylinder 226 has been provided with a clevise 238 which is supported on a pin 240 extending between lugs 232 to provide a lost motion connection.

It will be understood that the positions of collar 230 on clevis 238 could be reversed, if desired. Any such reversal is considered fully equivalent.

The trailing ground engaging members 20' can be of closed construction including wearplates 30' secured to and enclosing the open ends of hollow members 32'. In the alternative, however, ground engaging members 242 of open construction as shown in FIG. 22 can be utilized. Each open ground engaging member 242 comprises a hollow member 32', which is preferably of generally inverted rounded V-shaped cross section with the forward wall thereof being substantially upright in order to push the soil in a forward direction, and the rear wall being inclined to allow the soil to pass over the ground engaging member in the reverse direction. However, no wearplate 30' is utilized, and a small blades 244 and 246 can be secured to the walls of the hollow member 232' to improve cutting action and wear resistance.

From the foregoing, it will thus be apparent that the present invention comprises an improved soil leveling apparatus having several advantages over the prior art. One significant advantage involves use of an adjustable lost motion connection with the connecting means to provide controlled flexibility and some float of the apparatus in order to compensate for various three-point hitches and soil conditions. Another advantage involves the use of a forward ground engaging member which is not susceptible to clogging under sticky soil conditions in order to perform a scraping function more effectively. The connecting means also serves as the primary support for the scarifier assembly. Other advantages will be evident to those skilled in the art.

Although particular embodiments of the invention have been illustrated in the accompanying drawings and described in the foregoing detailed description, it will be understood that the invention is not limited only to embodiments disclosed, but is intended to embrace any equivalents, modifications, substitutions and/or rearrangements of elements falling within the scope of the invention as defined by the following claims.

I claim:

1. An adjustable lost motion connection for mounting between the top link of a three-point hitch and an attachment, which comprises:
   an outer channel section secured to the attachment, said outer channel section having top and bottom ends;
   an inner channel section extending into the top end of said outer channel section, said inner channel section having opposite ends;
   means for supporting said inner channel section for pivotal movement relative to said outer channel section about a transverse axis;
   means for connecting the top link of the three-point hitch to one end of said inner channel section in predetermined spaced relationship above the transverse axis; and
   adjustable stop means for limiting pivotal movement of said one end of said inner channel section in a direction toward the three-point hitch.

2. An adjustable lost motion connection as recited in claim 1, wherein the adjustable stop means comprises a plurality of shims which may be interposed between the inner and outer channel sections in a first position such that the shims are effective to stop pivotal movement of said one end of said inner channel section in a direction toward the three point hitch, wherein the number of shims interposed between the inner and outer channel sections can be selectively varied to adjust the degree of pivoting allowed for said one end of said inner channel section in a direction toward the three point hitch.

3. An adjustable lost motion connection as recited in claim 2, wherein the shims are rotatably carried on a support member for individual rotation thereon, wherein the shims may be selectively individually rotated from said first position to a second clearance position in which the shims are not effective to stop pivotal movement of said one end of said inner channel section in a direction toward the three point hitch, whereby the user can adjust the stop means by selecting a desired number of shims to be rotated into said first position.

4. An adjustable lost motion connection as recited in claim 3, wherein the support member on which the shims are carried is secured to the outer channel section.

5. An adjustable lost motion connector as recited in claim 1, further including a fixed stop on said outer channel section for limiting pivotal movement of the one end of said inner channel section in a direction away from the three-point hitch.

6. An apparatus for leveling soil, comprising
   a generally rectangular frame including a transverse, elongate scraper member and at least one trailing transverse elongate ground engaging member fixedly secured together in mutually spaced apart relationship;
   the scraper member including a leading lower edge, and each ground engaging member including at least one lower edge, with the leading edge of the scraper member and the lower edges of the ground engaging members being substantially coplanar;
   a hitch mounted on said frame for releasable connection to a draft means, said hitch including a pair of laterally spaced apart bottom connection points and a top connection point located in spaced relationship between and above the bottom connection points; and
   lost motion linkage means mounted on the top connection point of said hitch for limiting free pivotal movement of the apparatus away from the draft means about a transverse axis defined by the bottom connection points, wherein the lost motion linkage means comprises:
   a pivotal member at the top connection point of said hitch; and
   stop means operable between said hitch and said pivotal member for engaging said pivotal member after a predetermined amount of rotation of said member to limit the lost motion allowed by the pivotal member to a predetermined amount, and wherein said stop means is adjustable to selectively vary the amount of lost motion which is allowed before the stop means prevents further rotation by the pivotal member.

7. The soil leveling apparatus of claim 6, wherein the ground engaging members include a horizontal lower surface adjacent the lower edges thereof, and wherein the leading edge of the scraper member and the lower surfaces of the ground engaging members are substantially coplanar.

8. The soil leveling apparatus of claim 6, further including means connected to said frame which is adapted for scarifying ground soil.

9. The soil leveling apparatus of claim 8, wherein said scarifying means comprises:
a scarifier assembly mounted for vertical movement on said frame; and
means for adjusting the vertical positioning of said scarifier assembly.

10. The soil leveling apparatus of claim 8, wherein said scarifying means comprises:
a scarifier assembly mounted for pivotal movement on said frame means; and
means for selectively adjusting said scarifier assembly from a position of soil engagement to a position of soil disengagement.

11. The soil leveling apparatus of claim 10, wherein said scarifying means comprises at least one tooth element for engaging the soil.

12. The soil leveling apparatus of claim 10, wherein the frame means includes a pair of longitudinal side members to which the scraper member and ground engaging member are secured, and wherein the scarifying means includes:
a transverse shaft supported at opposite ends on the side members of said frame;
a sleeve mounted for rotation about said shaft; a plurality of depending soil working tools secured to said sleeve for pivotal movement between raised and lowered positions relative to the ground; and
means for selectively effecting pivotal movement of said sleeve and said soil working tools mounted thereon between raised and lowered positions which define, respectively, the soil disengagement and soil engagement positions.

13. The soil leveling apparatus of claim 12, further including:
a pair of opposing raised brackets secured to the side members of said frame, said shaft being supported between said brackets.

14. The soil leveling apparatus of claim 12, further including:
stop means associated with said sleeve for limiting pivotal movement of said soil working tools.

15. The soil leveling apparatus of claim 6, wherein the lost motion linkage means also limits free pivotal movement of the apparatus toward the draft means about a transverse axis defined by the bottom connection points.

16. An apparatus for leveling soil, comprising:
a generally rectangular frame including a transverse, elongate scraper member and one or more trailing transverse elongate ground engaging members fixedly secured in mutually spaced apart relationship;
the scraper member having a leading lower edge and each ground engaging member including at least one lower edge, with the leading edge of the scraper member and the lower edges of the ground engaging members being substantially co-planar;
a hitch mounted on said frame for releasable connection to a draft means, said hitch including a pair of laterally spaced apart bottom connection points and a top connection point located in spaced relationship between and above the bottom connection points; and
a lost motion linkage mounted on the top connection point of said hitch;
said lost motion linkage including:
at least one plate mounted for pivotal movement about the top connection point of said hitch, said plate having an upper end;
a pivotal connection point at the upper end of said plate; and
a stop for limiting pivotal movement of the upper end of said plate toward the draft means, wherein said stop is adjustable to adjust the amount of pivotal motion that is allowed for said upper end of said plate toward the draft means.

17. The soil leveling apparatus of claim 16, further including a stop on said hitch for limiting pivotal movement of the upper end of said plate away from the draft means.

18. The soil leveling apparatus of claim 16, wherein the ground engaging members include a horizontal lower surface adjacent the lower edges thereof, and wherein the leading edge of the scraper member and the lower surfaces of the ground engaging members are substantially coplanar.

19. The soil leveling apparatus of claim 18, wherein the adjustable stop is rotatable to adjust the amount of pivotal motion that is allowed for said upper end of said plate.

20. The soil leveling apparatus of claim 19, wherein the adjustable stop comprises a plurality of shims which may be interposed between the hitch and the plate in a first position such that the shims engage against the plate after predetermined rotation of the plate has occurred, wherein the shims are rotatably carried on a support member for individual rotation thereon, wherein the shims may be selectively individually rotated from said first position to a second clearance position in which the shims are not located to engage the plate, whereby the user can adjust the stop means by rotating a desired number of shims from said first position to said clearance position.

21. An apparatus for leveling soil, comprising:
a generally rectangular frame including a transverse, elongate scraper member and one or more trailing transverse elongate ground engaging members fixedly secured in mutually spaced apart relationship between a pair of longitudinal side members;
the scraper member of said frame having a leading lower edge and each ground engaging member including at least one lower edge, with the leading edge of the scraper member and the lower edges of the ground engaging members being substantially co-planar;
the side members of said frame each being of generally channel-shaped cross section having an outer leg with a straight lower edge which is substantially parallel with the lower edge of the scraper member and the lower edges of the ground engaging members, and an inwardly spaced inner leg which extends across the ground engaging members;
a hitch mounted on said frame for releasable connection to a draft means, said hitch including a pair of laterally spaced apart bottom connection points and a top connection point located in spaced relationship between said above the bottom connection points; and
a lost motion linkage mounted on the top connection point of said hitch.

22. The soil leveling apparatus of claim 21, wherein the inner leg has a straight lower edge which is secured to the ground engaging members.

23. The soil leveling apparatus of claim 22, wherein the lost motion linkage has means for limiting free pivotal movement of the apparatus away from the draft means about a transverse axis defined by the bottom connection points.

24. The soil leveling apparatus of claim 23, wherein the lost motion linkage is adjustable.

25. The soil leveling apparatus of claim 23, wherein the lost motion linkage also limits free pivotal movement of the apparatus toward the draft means about a transverse axis defined by the bottom connection points.

26. The soil leveling apparatus of claim 21, wherein the ground engaging members include a horizontal lower surface adjacent the lower edges thereof, and wherein the leading edge of the scraper member and the lower surfaces of the ground engaging members are substantially coplanar.

27. An apparatus for working soil, comprising:
a frame means including at least one forward ground engaging members longitudinally spaced apart from at least one rearward ground engaging member;
a three-point hitch means attached to said frame means at or adjacent the forward ground engaging member, said three-point hitch means including a top connection point and a pair of laterally spaced apart bottom connection points, and three-point hitch means having at said top connection point a lost motion linkage which is freely pivotal about a transverse axis on the three-point hitch means during normal operation of the frame means such that the forward ground engaging member can be vertically raised and lowered without vertical movement of the rearward ground engaging member by a vertical lifting movement of the bottom connection points; and
a stop for engaging the lost motion linkage after a predetermined vertical movement of the bottom connection points such that further upward motion of the bottom connection points will raise the entire frame means from the ground through the action of all three connection points, wherein said stop is adjustable to change the amount of predetermined vertical movement allowed before the lost motion linkage means is engaged.

28. An apparatus for working soil according to claim 27, wherein said forward ground engaging member comprises a scraper member with an edge and said rearward ground engaging member comprises a surface for leveling soil.

29. An apparatus for working soil according to claim 27, further including a second stop for limiting pivotal motion of the lost motion linkage in the other direction.

30. An apparatus for working soil according to claim 27, wherein said forward ground engaging member comprises a scarifying means for loosening the soil.

31. An apparatus for working soil according to claim 30, wherein said rearward ground engaging member comprises a surface of smooth the soil.

32. An apparatus for working soil according to claim 30, wherein said rearward ground engaging member comprises a roller to pulverize the soil.

33. An apparatus for working soil according to claim 30, wherein a plurality of rearward ground engaging members are provided, and wherein one of said rearward ground engaging members comprises a surface to smooth the soil and another of said rearward ground engaging members comprises a roller to pulverize the soil.

34. An apparatus for working soil according to claim 33, further including a leading scraper member attached to said frame means.

35. An apparatus for working soil according to claim 30, wherein said forward ground engaging member comprises a scraper member with an edge for moving and leveling soil.

36. An apparatus for working soil according to claim 35, wherein said rearward ground engaging member comprises a roller for pulverizing the soil.

37. An apparatus for working soil according to claim 35, wherein a plurality of rearward ground engaging members are provided, and wherein one of said rearward ground engaging members comprises a surface to smooth the soil and another of said rearward ground engaging members comprises a roller to pulverize the soil.

38. An apparatus for working soil adapted for connection to a draft vehicle having a three-point lift mechanism including two lower lift arms and a central upper arm, comprising:
a frame means including at least one transverse ground engaging member for working soil;
a three-point hitch means attached to said frame means at or adjacent the front of the frame, said three-point hitch means including a top connection point for the upper arm and a pair of laterally spaced apart bottom connection points for the lower lift arms, said three-point hitch means having a lost motion linkage at the top connection point, said linkage comprising a member which is freely pivotal about a transverse axis on the three-point hitch means during normal operation of the frame means, wherein the top connection point for the upper arm is located on the member spaced from the transverse pivotal axis of the member such that upward movement of the lower lift arms will cause the member to pivot about its transverse pivotal axis; and
stop means acting between the hitch means and the member for allowing only a predetermined amount of rotation of the member about the transverse pivotal axis as the lower arms move upwardly such that further upward motion of the lower arms will raise the entire frame means off the ground by allowing the upper arm to act in concert with the lower arms in raising the frame means, wherein said stop means is adjustable to change the amount of predetermined rotation allowed for the member before the stop means is effective to stop such rotation to thereafter lift the frame means off the ground.

39. The soil working apparatus of claim 38, wherein the stop means provides a predetermined distance between the pivotal member and a stop surface to allow the member to rotate over its predetermined amount of rotation before the member engages the stop surface, and wherein the predetermined distance between the pivotal member and the stop surface is adjustable to adjust the amount of predetermined rotation that is allowed for the pivotal member.

40. The soil working apparatus of claim 39, wherein the stop means is rotatable to effect the variation in the predetermined distance between the stop surface and the pivotal member.

41. The soil working apparatus of claim 40, wherein the adjustable stop means comprises a plurality of shims which may be interposed between the hitch means and the pivotal member in a first position such that the shims engage against the pivotal member after the predetermined rotation of the pivotal member has occurred, wherein the shims are rotatably carried on a support member for individual rotation thereon, wherein the shims may be selectively individually rotated from said first position to a second clearance position in which the shims are not located to engage the pivotal member, whereby the user can adjust the stop means by rotating a desired number of shims from said first position to said clearance position.

42. An apparatus for working soil adapted for connection to a draft vehicle having a three-point lift mechanism including two lower lift arms and a central upper arm, comprising:

frame means which comprises a forward portion and a rearward portion, the frame means having a scraper member mounted in the forward portion of the frame means for loosening ground soil and at least one ground engaging member mounted in the rearward portion of the frame means, the ground engaging member having at least one edge in engagement with the ground for leveling any ground soil that has been loosened by the scraper member;

a smoothing roller rotatably coupled to the rearward portion of the frame means and trailing behind the frame means for smoothing soil;

three-point hitch means located in the forward portion of said frame adjacent the scraper member, said three-point hitch means including a top connection point for the upper arm and a pair of laterally spaced apart bottom connection points for the lower lift arms, said three-point hitch means having a lost motion linkage at the top connection point, said linkage comprising a member which is freely pivotal about a transverse axis on the three-point hitch means during normal operation of the frame means, wherein the top connection point for the upper arm is located on the member spaced from the transverse pivotal axis of the member such that upward movement of the lower lift arms will cause the member to pivot about its transverse pivotal axis; and stop means carried on the hitch means and acting between the hitch means and the member for allowing only a predetermined amount of rotation of the member about the transverse pivotal axis as the lower arms move upwardly such that further upward motion of the lower arms will raise the entire frame means off the ground by allowing the upper arm to act in concert with the lower arms in raising the frame means, wherein the user can use the lower lift arms to lift the forward portion of the frame up off the ground while leaving the rearward portion of the frame in engagement with the ground to adjust the effects of the scraper member, the ground engaging member and the smoothing roller on the ground during a soil leveling operation without having the entire frame means be lifted from the ground, such lifting of the entire frame means occurring only after the stop means engages the pivotal member of the lost motion linkage during upward motion of the lower lift arms.

43. The soil leveling apparatus of claim 42, wherein said frame means comprises at least one longitudinally extending member, and a plurality of elongate ground-engaging members which are connected to said longitudinal member and extend in a direction which is substantially transverse to the axis of said longitudinal member.

44. The soil leveling apparatus of claim 43, wherein said at least one longitudinally extending member comprises a pair a longitudinal side members, whereby loosened soil is kept substantially contained within said frame means.

45. The soil leveling apparatus of claim 42, wherein said scraper member includes a downwardly extending portion having a leading lower edge which is adapted for engaging the ground surface in a scraping type relationship.

46. The soil leveling apparatus of claim 45, wherein said scraper member is constructed of a channel-shaped element which, in cross section, has an open bottom, and wherein said downwardly extending element comprises one leg of said channel element.

47. The soil leveling apparatus of claim 46, wherein said channel element has an inverted J-shaped cross section.

48. The soil leveling apparatus of claim 42, wherein said at least one ground engaging member of the frame means comprises a transverse member having a horizontal surface adapted to bear against the ground and level the ground.

49. The soil leveling apparatus of claim 42, wherein means are connected to said frame means which is adapted for scarifying ground soil, wherein said scarifying means comprises at least one tooth element for engaging the soil, and wherein said scarifying means is located on the frame means behind the scraper member but in front of the ground engaging member.

50. The soil leveling apparatus of claim 49, wherein said scarifying means comprises:
a scarifier assembly mounted for vertical movement on said frame; and
means for adjusting the vertical positioning of said scarifier assembly.

51. The soil leveling apparatus of claim 50, wherein said scarifying means comprises a plurality of tine members, said tine members each extending in a non-parallel relationship with respect to at least one adjacent tine member, whereby ground soil is less likely to become lodged in between.

52. The soil leveling apparatus of claim 49, wherein said frame means further comprises means for guiding said scarifying means in a free floating relationship relative to an underlying ground surface, whereby said scarifying means will engage the underlying ground surface with a constant scarifying force.

53. The soil leveling apparatus of claim 49, wherein said scarifying means comprises:
a scarifier assembly mounted for pivotal movement on said frame means; and
means for selectively adjusting said scarifier assembly from a position of soil engagement to a position of soil disengagement.

54. An apparatus for working soil adapted for connection to a draft vehicle having a three-point lift mechanism including two lower lift arms and a central upper arm, comprising:
a frame means including at least one transverse ground engaging member for working soil;
a three-point hitch means attached to said frame means at or adjacent the front of the frame, said three-point hitch means including a top connection point for the upper arm and a pair of laterally spaced apart bottom connection points for the lower lift arms, said three-point hitch means having a lost motion linkage at the top connection point, said linkage comprising a member which is freely pivotal about a transverse axis on the three-point hitch means during normal operation of the frame means, wherein the top connection point for the upper arm is located on the member spaced from the transverse pivotal axis of the member such that upward movement of the lower lift arms will cause the member to pivot about its transverse pivotal axis; and first stop means acting between the hitch means and the member for allowing only a predetermined amount of rotation of the member in a first direction about the transverse pivotal axis as the lower arms move upwardly such that further upward motion of the lower arms will raise the entire frame means of the ground by allowing the upper arm to act in concert with the lower arms in raising the frame means, the predetermined amount of rotation that is allowed by the first stop means allowing the frame means a limited amount of flotation relative to the ground as the frame means pivots in a first direction about the bottom connection points; and second stop means acting between the hitch means and the member for allowing only a predetermined amount of rotation of the member in a second direction about the transverse pivotal axis to allow the frame means a limited amount of flotation relative to the ground as the frame means pivots in a second direction about the bottom connection points which second direction is opposed to the first direction of frame means rotation.

55. The apparatus of claim 54, wherein the first and second stop means comprise stop members fixed on the hitch means and adapted to engage against the pivotal member after a relatively small amount of rotation in the first and second directions of frame means rotation about the bottom connection points, whereby the frame means is prevented from dropping too sharply away from the draft vehicle or from jackknifing towards the draft vehicle.

56. The apparatus of claim 55, wherein the first stop means is adjustable on the hitch means to adjust the distance between the first stop means and the pivotal member to adjust the amount of rotation allowed for the frame means in its first direction of rotation about the bottom connection points.

57. An adjustable lost motion connection for mounting between the top link of a three-point hitch and an attachment, which comprises:
    an outer section secured to the attachment, said outer section having top and bottom ends and comprising spaced apart side plates;
    an inner section extending into the top end of said outer section between said side plates of said outer section, said inner section having opposite ends;
    means for supporting said inner section for pivotal movement relative to said outer section about a transverse axis;
    means for connecting the top link of the three-point hitch to one end of said inner section in predetermined spaced relationship to the transverse axis; and
    adjustable stop means for limiting pivotal movement of said one end of said inner section relative to the three point hitch.

58. An adjustable lost motion connection as recited in claim 57, wherein the said one end of said inner section is in a predetermined spaced relationship above the transverse axis, and wherein the said pivotal movement which is limited by the stop means is in a direction toward the three point hitch.

* * * * *